US009958907B2

(12) United States Patent
Kitamura et al.

(10) Patent No.: US 9,958,907 B2
(45) Date of Patent: May 1, 2018

(54) TOUCH PAD FOR A PORTABLE ELECTRONIC APPARATUS

(71) Applicant: LENOVO (SINGAPORE) PTE. LTD., Singapore (SG)

(72) Inventors: Masahiro Kitamura, Kanagawa-ken (JP); Mitsuo Horiuchi, Kanagawa-ken (JP)

(73) Assignee: LENOVO (SINGAPORE) PTE LTD, Singapore (SG)

( * ) Notice: Subject to any disclaimer, the term of this patent is extended or adjusted under 35 U.S.C. 154(b) by 0 days. days.

(21) Appl. No.: 15/212,030

(22) Filed: Jul. 15, 2016

(65) Prior Publication Data

US 2017/0017266 A1 Jan. 19, 2017

(30) Foreign Application Priority Data

Jul. 16, 2015 (JP) ................................ 2015-142312

(51) Int. Cl.
*G06F 1/16* (2006.01)
*G06F 3/0354* (2013.01)

(52) U.S. Cl.
CPC ............ *G06F 1/169* (2013.01); *G06F 1/1616* (2013.01); *G06F 3/03547* (2013.01); *G06F 2203/04105* (2013.01); *H01H 2215/03* (2013.01); *H01H 2217/02* (2013.01); *H01H 2221/062* (2013.01)

(58) Field of Classification Search
CPC .... G06F 1/169; G06F 1/1616; G06F 3/03547; H01H 2221/062; H01H 2217/02
See application file for complete search history.

(56) References Cited

U.S. PATENT DOCUMENTS 3,917,917 A 11/1975 Murata
4,631,378 A * 12/1986 Nobesawa ........... H01H 13/705 200/342
5,144,103 A 9/1992 Suwa
(Continued)

FOREIGN PATENT DOCUMENTS

JP 10-198507 A 7/1998
JP 2013-513865 A2 6/2011
(Continued)

OTHER PUBLICATIONS

Application No. EP16 179 115, European Search Report dated Nov. 25, 2016.
(Continued)

*Primary Examiner* — Binh Tran
*Assistant Examiner* — Douglas Burtner
(74) *Attorney, Agent, or Firm* — Antony P. Ng; Russell Ng PLLC

(57) ABSTRACT

An electronic apparatus having an input device is disclosed. The input device is capable of reducing the sound generated when an operation-input part returns to its original position after being pressed. The input device includes a base plate having a hook standing towards the operation-input part. The operation-input part has an arm member that can come into contact with the hook. A contact of the arm member with the hook specifies an ascending limit of the operation-input part, and at least one of the arm member and the hook has elasticity in their contacting direction to reduce rebound sound.

16 Claims, 7 Drawing Sheets

10
24a(24b,24c) 28 40a G 50b 50a 46 22 22a 44 42 40 61 62
30 32 50 46a(47) 56 26 71 70 72 55
REAR FRONT

(56) References Cited

U.S. PATENT DOCUMENTS 5,874,696 A * 2/1999 Hayashi ................ G06F 1/1616 200/345
5,990,435 A * 11/1999 Chao .................... H01H 13/702 200/345
8,139,347 B2 * 3/2012 Chiang ................... G06F 1/169 361/679.18
9,292,051 B2 * 3/2016 Takata .................. G06F 3/0338
2007/0084702 A1 * 4/2007 Lin ...................... H01H 13/063 200/5 A
2010/0079404 A1 * 4/2010 Degner ............... G06F 3/03547 345/174
2010/0139990 A1 * 6/2010 Westerman ............. G06F 3/017 178/18.03
2010/0259880 A1 * 10/2010 Tatsukami ............ G06F 1/1616 361/679.09
2010/0259891 A1 * 10/2010 Tachikawa ............ G06F 1/1688 361/679.55
2011/0314267 A1 * 12/2011 Watanabe ............. G06F 9/4401 713/2
2012/0134109 A1 * 5/2012 Takahashi ............. G06F 1/1684 361/679.55
2012/0262256 A1 * 10/2012 Furukawa ................ G05G 1/02 335/106
2012/0307138 A1 * 12/2012 Matsuzawa ............ G03B 17/02 348/373
2014/0015754 A1 * 1/2014 Chang ................... G06F 3/0362 345/168
2014/0053410 A1 * 2/2014 Huang ...................... B26B 1/08 30/162
2014/0138234 A1 * 5/2014 Maruyama ............. H01H 3/125 200/517
2015/0084898 A1 * 3/2015 Ishikawa ................. G06F 1/169 345/173
2015/0185779 A1 * 7/2015 Doi ...................... G10K 11/002 361/679.1
2016/0147328 A1 * 5/2016 Doi ......................... G06F 1/169 345/157

FOREIGN PATENT DOCUMENTS

JP 2013-025422 A 7/2011
JP 2012-164623 A 8/2012
JP 2014-112449 A 6/2014
JP 2014-165025 A 9/2014
TW 562196 11/2003
TW M418334 12/2011
TW M419978 1/2012
TW 201432757 A 8/2014
TW 201440106 A 10/2014
TW 201513154 A 4/2015

OTHER PUBLICATIONS

Application No. GB1612114.7, Combined Search and Examination Report dated Jan. 5, 2017.

* cited by examiner

TOUCH PAD FOR A PORTABLE ELECTRONIC APPARATUS

PRIORITY CLAIM

The present application claims benefit of priority under 35 U.S.C. § § 120, 365 to the previously filed Japanese Patent Application No. JP2015-142312 with a priority date of Jul. 16, 2015, which is incorporated b reference herein.

BACKGROUND OF THE INVENTION

1. Technical Field

The present invention relates to electronic apparatuses in general, and particularly to an electronic apparatus having an input device for receiving an input operation.

2. Description of Related Art

In addition to a keyboard device, a laptop personal computer (laptop PC) is typically provided with various input devices, such as a touch pad and a pointing device, as an alternative to a mouse. A touch pad enables the manipulation of a cursor displayed on a display device in response to a touch operation thereto with a fingertip or a pen tip.

A touch pad is commonly provided with a member to specify the ascending limit (position) of the touch pad. When the pressed touch pad returns to the original position, the touch pad comes into contact with such a member to specify the ascending limit, which usually emits a rebound sound. It would be desirable to reduce such rebound sound that is generated when a touch pad comes into contact with a member to specify the ascending limit.

SUMMARY OF THE INVENTION

In accordance with a preferred embodiment of the present invention, an input device includes an operation-input part for receiving an input operation that is vertically movably supported above a base plate. The base plate has a hook standing towards the operation-input part, and the operation-input part has an arm member that can come into contact with the hook. A contact of the arm member with the hook specifies an ascending limit of the operation-input part, and at least one of the arm member and the hook has elasticity in their contacting direction. Since at least one of the arm member and the hook has elasticity in their contacting direction, any rebound sound generated from a contact of the arm member with the hook when the pressed operation-input part returns to the original position is reduced.

All features and advantages of the present disclosure will become apparent in the following detailed written description.

BRIEF DESCRIPTION OF DRAWINGS

The disclosure itself, as well as a preferred mode of use, further objects, and advantages thereof, will best be understood by reference to the following detailed description of an illustrative embodiment when read in conjunction with the accompanying drawings, wherein.

DETAILED DESCRIPTION OF A PREFERRED EMBODIMENT

Figure 1:
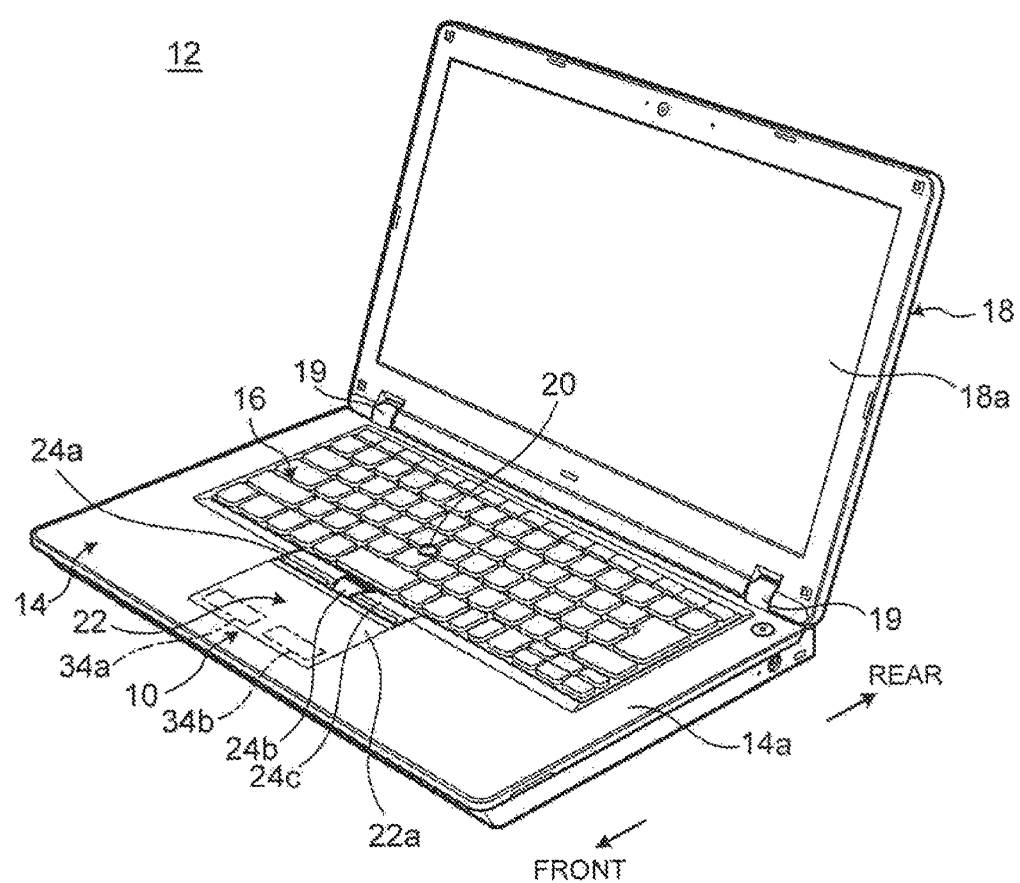
FIG. 1 is a perspective view of an electronic apparatus having an input device according to a preferred embodiment of the present invention.

Referring now to the drawings and in particular to FIG. 1, there is depicted a perspective view of an electronic apparatus 12 including an input device 10, according to one embodiment of the present invention. In the following descriptions, based on the usage form of the input device 10 in the electronic apparatus 12 shown in FIG. 1 as a reference, the side near the operator is called the from side (forward), the back side is called the rear side (rearward), the thickness direction of a body chassis 14 making up the electronic apparatus 12 is called the vertical direction, and the width direction thereof is called the horizontal direction.

As shown in FIG. 1, the electronic apparatus 12 is a laptop personal computer (laptop PC) that includes the body chassis 14 having the input device 10 and a keyboard device 16, and a display chassis 18 having a display unit 18*a*, such as a liquid crystal display. The display chassis 18 is coupled openably/closably to the body chassis 14 via a pair of left and right hinges 19.

The body chassis 14 internally stores various electronic components, such as a board, a processing unit, a hard disk device, and a memory, which are not illustrated. The input device 10 and the keyboard device 16 are placed at the front and the rear on a top face 14*a* of the body chassis 14, respectively. At a substantially center of the keyboard device 16, a pointing stick 20 is provided. The pointing stick 20 is to manipulate a cursor (mouse pointer) displayed on the display unit 18*a*, which is input means that can be manipulated instead of the mouse.

Although the present embodiment exemplifies the configuration where the input device 10 is mounted on the electronic apparatus 12 as a laptop PC as stated above, the input device 10 may be mounted on a keyboard device as a single body to be connected to a desktop PC or the like.

Figure 2:
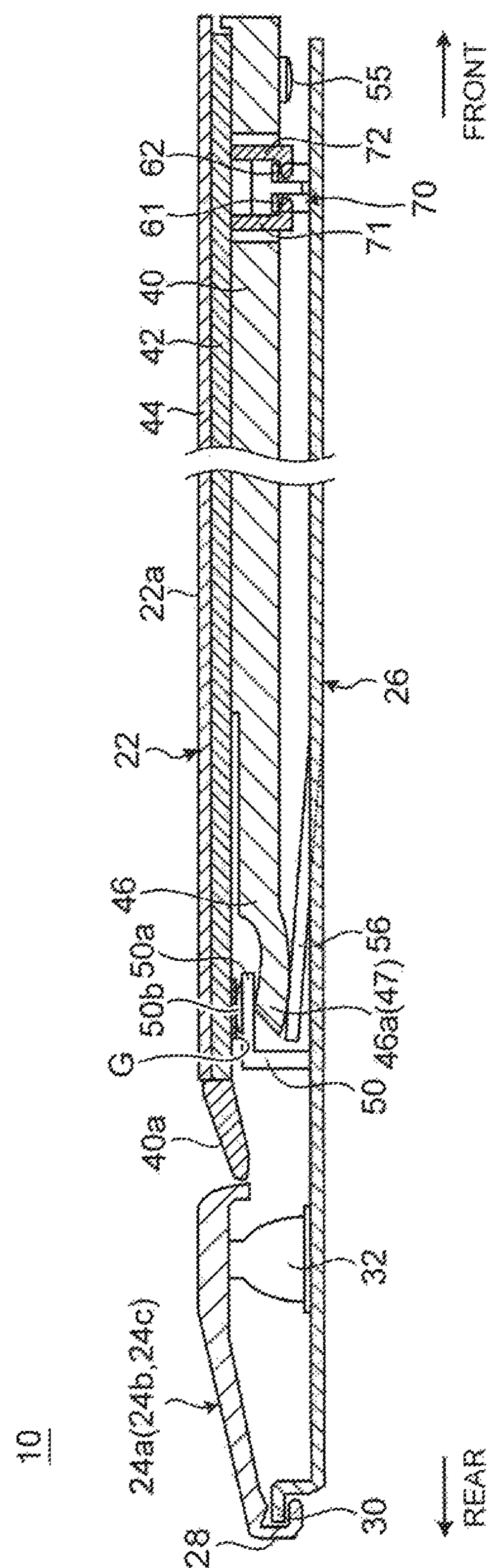
FIG. 2 is a cross-sectional side view showing the input device from FIG. 1.
Figure 3:
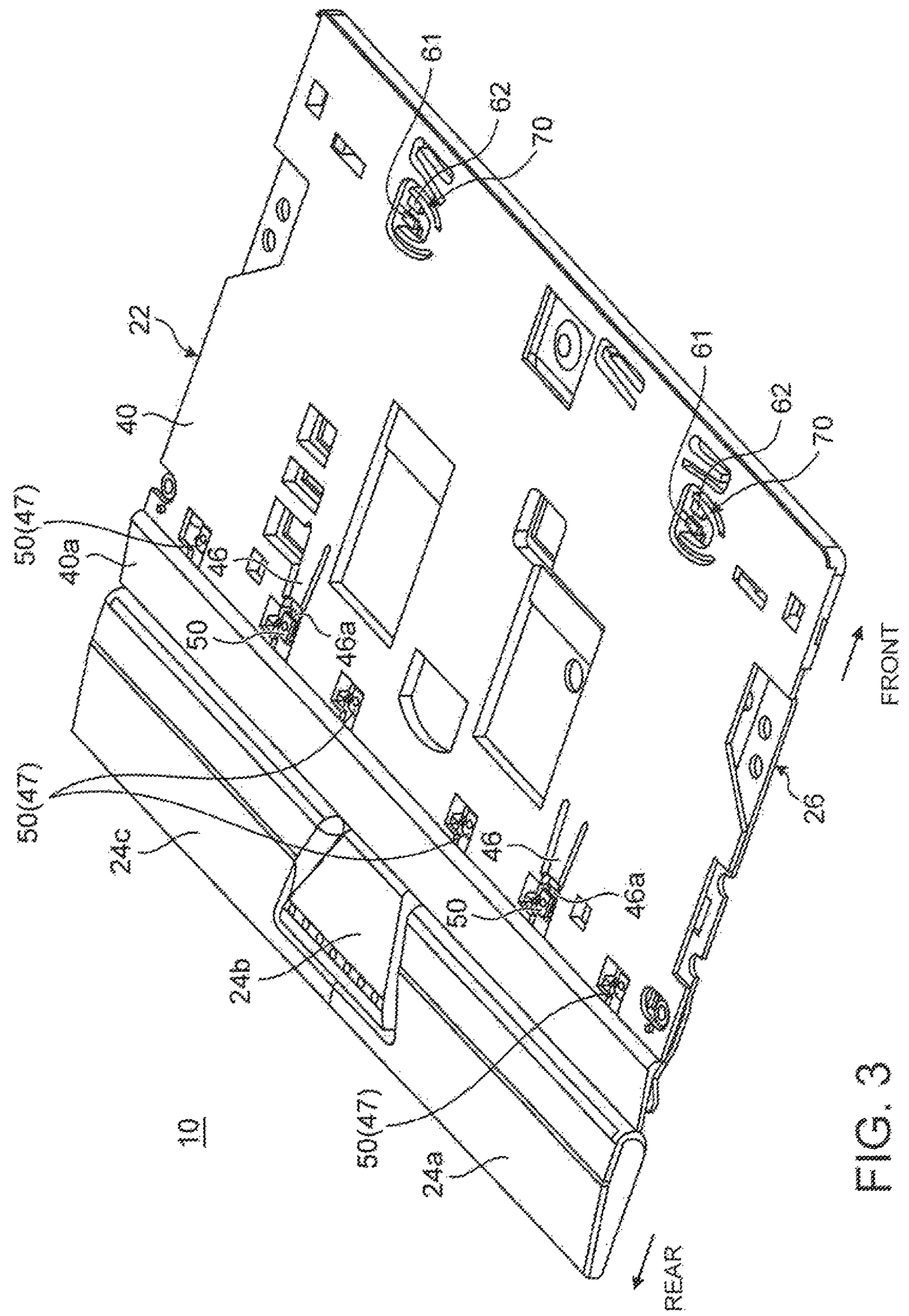
FIG. 3 is a perspective view of the input device shown in FIG. 2.

With reference now to FIGS. 2 and 3, there are depicted a cross-sectional side view and a perspective view of the input device 10, respectively, according to a preferred embodiment of the present invention. As shown in FIG. 2, the input device 10 includes a touch pad (operation-input part) 22 to receive a touch operation of an operator by bringing a fingertip or the like closer to or into contact with there, and three press buttons 24*a*, 24*b* and 24*c* arranged along the rear end part of the touch pad 22.

As shown in FIGS. 2 and 3, the touch pad 22 and the press buttons 24*a* to 24*c* are supported on the side of the upper thee of the base plate 26 that is a metal plate member. The press buttons 24*a*-24*c* operate in relation to the cursor manipulation using the pointing stick 20 or the touch pad 22, and are click-operation buttons corresponding to a left button, a center button and a right button of a typical mouse, respectively. The press buttons 24*a*-24*c* may be placed close to the forward end of the touch pad 22, or may be disposed with a frame of the body chassis 14 put between the touch pad 22 and the buttons.

As shown in FIG. 2, the press buttons 24*a*-24*c* have their rear ends 28 that rotatahly engage with a supporting piece 30 standing from the rear end of the base plate 26, whereby these buttons can swing about the rear-ends 28 as a supporting point. Therefore, when the front-end part of each press button 24*a*-24*c* is pressed, then a rubber dome 32 placed inside is compressed, whereby a switch not illustrated, such as a membrane switch, provided on the upper face of the base plate 26 is turned on.

Next, the touch pad 22 is configured as a click pad, with which a click operation by pressing also can be performed, in addition to a touch operation.

As shown in FIG. 1, pseudo button areas 34*a*, 34*b* are configured on a part of a touch operation face 22*a* as the surface of the touch pad 22 that is close to the front side. The pseudo button areas 34*a*, 34*b* have their respective areas on the touch operation face 22*a* defined with coordinates, and are invisible. In response to a press operation of the touch pad 22 while bringing a fingertip in contact with one of the pseudo button areas 34*a*, 34*b*, then processing or display corresponding to the pseudo button area 34*a*, 34*b* is performed. For instance, the two pseudo button areas 34*a* and 34*b* correspond to the left button and the right button of a typical mouse, respectively.

As shown in FIG. 2, the touch pad 22 has a three-layered configuration, including a housing plate 40 as a bottom plate that is placed to be opposed to the base plate 26, a board plate (board) 42 that is stacked on the upper face of the housing plate 40 to detect a touch operation to the touch operation face 22*a*, and a pad plate (pad) 44 that is stacked on the board plate 42, whose surface is the touch operation face 22*a* to receive a touch operation. FIG. 3 omits the illustration of the board plate 42 and the pad plate 44.

The board plate 42 is a board having a rectangular shape in planar view, which is a sensor to detect a touch operation to the pad plate 44 or a press operation to the touch pad 22. The board plate 42 is connected to a board in the body chassis 14 via wiring not illustrated. To the board plate 42, not-illustrated wiring from the press buttons 24*a* to 24*c* is connected. The pad plate 44 is a glass plate or a resin plate having a rectangular shape in planar view, and is fixedly attached to the upper face of the board plate 42 with adhesive, double-faced tape, or the like. The board plate 42 is provided with ground line on the lower face close to the rear end, the ground line being a belt-like conductive part that extends along the horizontal direction (see FIG. 2).

As shown in FIGS. 2 and 3, the housing plate 40 is a resin plate having a rectangular shape in planar view, and chassis component to hold the board plate 42 and the pad plate 44. On the upper face of the housing plate 40, the board plate 42 is fixedly attached with adhesive, double-faced tape, or the like. The housing plate 40 has an inclined-face part 40*a* at the rear end and near the forward-end face of the press buttons 24*a* to 24*c* that is inclined downward to the rear side. Due to such an inclined-face part 40*a*, the touch pad 22 does not hinder the press operation of the press buttons 24*a* to 24*c*.

A pair of left and right elastic pieces 46 is provided on the front side of the inclined-face part 40*a* of the housing plate 40 so as to be elongated toward the rear. The elastic pieces 46 are formed by cutting away their both left and right lateral parts and rear parts in the thickness direction se as to be a piece like a narrow tongue, whereby they have a cantilever structure to be elastic to some extent. Each elastic piece 46 has a nail 46*a* at the end (rear-end) so as to be displaced to be curved downward. The elastic pieces 46 are not fixedly attached to the lower face of the board plate 42, and at least the nails 46*a* thereof are disposed to have a predetermined gap between the upper faces thereof and the board plate 42, whereby protruding pieces 50 that are formed by cutting the upper face of the base plate 26 so as to lift it up described later are sandwiched between the upper faces of the nails 46*a* and the lower face of the board plate 42.

Further, a set of engagement pieces 47 are provided on the front side of the inclined-face part 40*a* of the housing plate 40 so as to have a shape substantially similar to that of the nails 46*a* of the elastic pieces 46 and to be elongated short to the rear. Each of the engagement pieces 47 also engages with the corresponding protruding piece 50 that is cut to lift up from the base plate 26 (see FIGS. 2 and 3).

Since the elastic pieces 46 and the engagement pieces 47 of the housing plate 40 rotatably engage with the corresponding protruding pieces 50 of the base plate 26, the housing plate 40 (touch pad 22) can swing relative to the base plate 26 about these engaging portions as the supporting point. In the present embodiment, a non-illustrated guide structure vertically guides the housing plate 40 relative to the base plate 26, so that the housing plate 40 is configured to more vertically while moving the engagement portions of the elastic pieces 46 and the engagement pieces 47 with their corresponding protruding pieces 50 rearward and forward to some extent.

As shown in FIG. 2, a detection switch 55 is provided at a substantially center part on the lower face of the housing plate 40 close to the forward end. The detection switch 55 is to issue a predetermined detection signal when the touch pad 22 is pressed. The detection switch 55 is a metal dome switch, for example, that bulges downward from the lower face of the housing plate 40, which is turned on when the touch pad 22 is pressed until the switch comes into contact with the base plate 26, and this ON signal is detected by the board plate 42.

As shown in FIG. 3, the protruding pieces 50 are formed to stand from the upper face of the base plate 26. Each protruding piece 50 is formed like an angular U-letter shape in lateral view that has an abutting plate 50*a* at the upper end that is bent toward the rear when a part of the base plate 26 is cut to lift upward. On the upper face of the abutting plate 50*a* of the protruding piece 50, a dome-like convex 50*b* is provided so as to bulge upward. The protruding pieces 50 are provided at the positions corresponding to the elastic pieces 46 and the engagement pieces 47 of the housing plate 40. Among these protruding pieces 50, below the protruding pieces 50 corresponding to the elastic pieces 46, an elastic pressing part 56 is disposed, which is formed on the upper face of the base plate 26.

Figure 4:
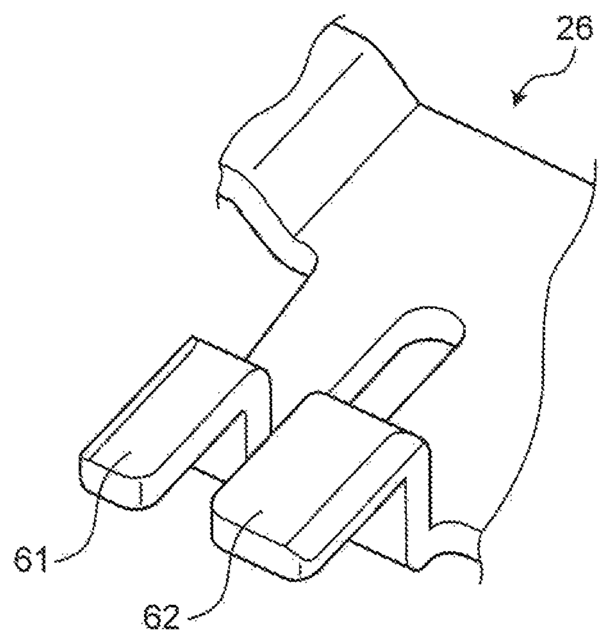
FIG. 4 is a perspective view showing the major part of a base plate in the input device shown in FIG. 3.
Figure 5:
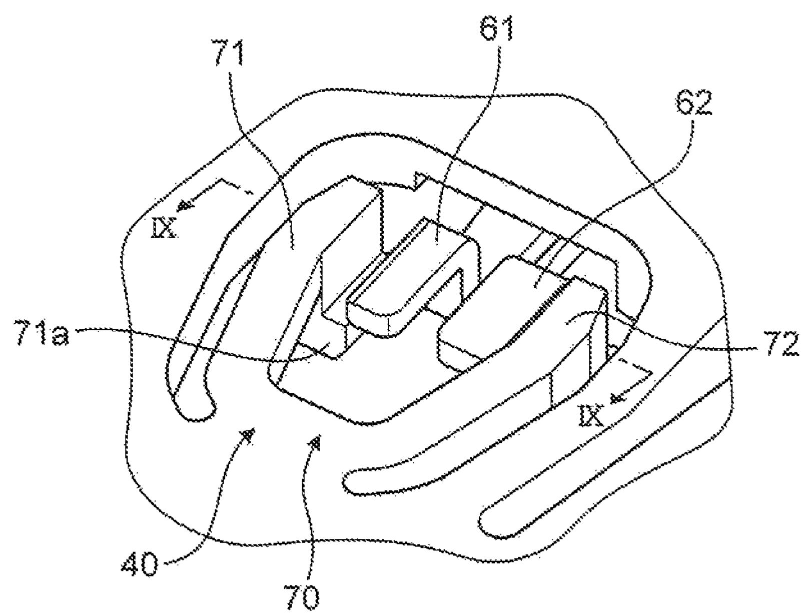
FIG. 5 is an enlarged view of the major part of the base plate shown in FIG. 4.
Figure 6:
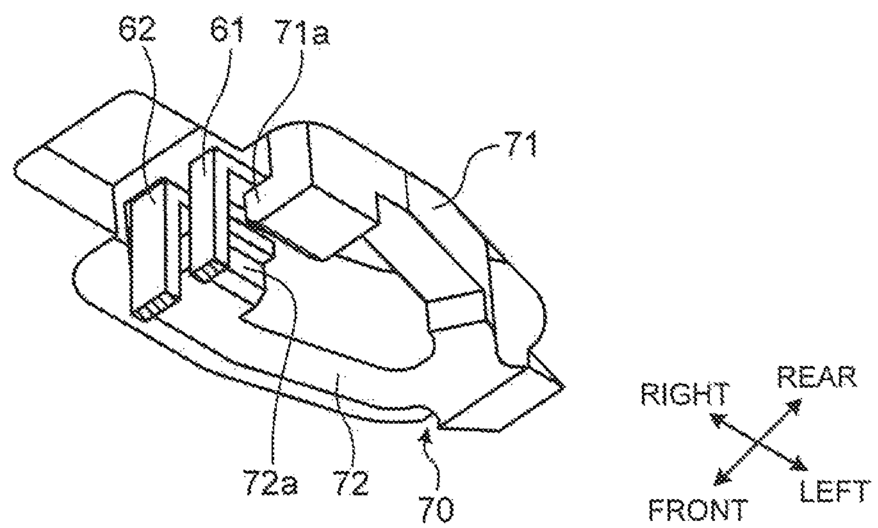
FIG. 6 shows the major part of the input device in FIG. 3 viewed from the rear.
Figure 7:
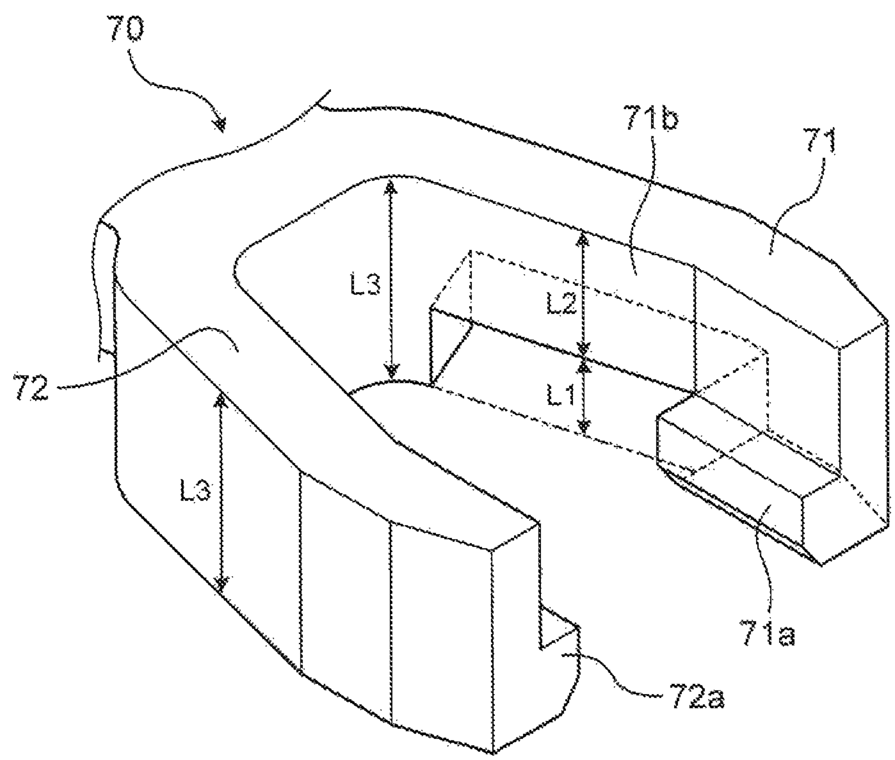
FIG. 7 is an enlarged view of the major part of a housing plate in the input device shown in FIG. 3.

FIGS. 4 and 5 depict a perspective view and an enlarged view, respectively, of the major part of the base plate 26 in the input device 10 shown in FIG. 3. FIG. 6 shows the major part of the input device 10 in FIG. 3 viewed from the rear face, and FIG. 7 is a perspective enlarged view of the major part of the housing plate 40 in the input device 10 shown in FIG. 3. FIG. 6 shows a part of the base plate 26 only (a first hook 61 and a second hook 62) for easier viewing.

As shown in FIGS. 3 and 4, a hook (first hook) 61 standing like a L-letter shape in cross section from the upper face of the base plate 26 toward the touch pad 22 (operation-input part) and another hook (second hook) 62 opposed to this hook 61 are provided at the base plate 26 of a part close to the front end. Two of such first hook 61 and second hook 62 are disposed on the left and right of the base plate 26 of a part close to the front end, where the first hook 61 and the second hook 62 of each pair is disposed in the front-back direction (see FIG. 3).

As shown in FIG. 3, at a part close to the front end of the housing plate 40, a pair of left and right latches 70 is provided. Each latch 70 has an arm member (first arm member) 71 that can come into contact with the first hook 61 and another arm member (second arm member) 72 that can come into contact with the second hook 62. The latch 70 has a substantially V-letter shape in a planar view, including the first arm member 71 and the second are member 72 (see FIGS. 5 and 6). That is, the first arm member 71 and the second arm member 72 are disposed so that their parts closed to the forward end are spaced from each ether.

These first arm member 71 and second arm member 72 protrude in the direction intersecting with the operating direction of the press operation to the touch pad 22, and are configured so that their forward ends can come into contact with the first hook 61 and the second hook 62, respectively. The forward ends of the first arm member 71 and the second arm member 72 are provided with protruding pieces 71*a* and 72*a*, respectively, that protrude in their opposed direction so that the first hook 61 and the second hook 62 can come into contact with these protruding pieces 71*a* and 72*a*.

In the state where the touch pad 22 is not pressed, as shown in FIGS. 5 and 6, the forward ends of the first hook 61 and the first arm member 71 come into contact with vertically, whereby the ascending limit of the touch pad 22 is specified. That is, the first hook 61 and the first arm member 71 are parts that couple in the direction where the housing plate 40 is overlapped with the base plate 26.

Further, in the state where the touch pad 22 is not pressed, there is a slight gap between the second hook 62 and the second arm member 72, meaning that the second hook 62 and the second arm member 72 do not come into contact with each other. That is, the second hook 62 is disposed at a position higher than the first hook 61, whereby the former does net come into contact with the second arm member 72 when the touch pad 22 is not pressed (see FIG. 9B). In this way, the second arm member 72 is configured so that it can come into contact with the second hook 62 at a position above the ascending limit of the touch pad 22.

Herein, at least one of the first hook 61 and the first arm member 71 have elasticity in their contacting direction, and in the present embodiment, both of the first hook 61 and the first arm member 71 have elasticity in their contacting direction (vertical direction in FIG. 3). Specifically, the first hook 61 has a length from the base end to the forward end that is longer than that of the second hook 62 and has a smaller width, whereby it has elasticity in the vertical direction (see FIG. 4). Alternatively, the thickness of the first hook 61 may be made smaller, whereby elasticity thereof can be increased.

Meanwhile the first arm member 71 is made thinner than the second arm member 72 so as to have elasticity. Specifically as shown in FIG. 7, the first arm member 71 has a thin part 71*b* having a thickness L2 that is thinner than the thickness indicated with L3. That is, as shown in FIG. 7, the thin part 71*b* is thinner than the second arm member 72 by the thickness L1.

In other words, the second hook 62 has a length from the base end to the forward end that is shorter than that of the first hook 61 and has a larger width, whereby the second hook 62 has high stiffness compared with the first hook 61. Then the second arm member 72 is thicker than the first arm member 71, whereby the second arm member 72 has high stiffness compared with the first arm member 71.

Figure 8:
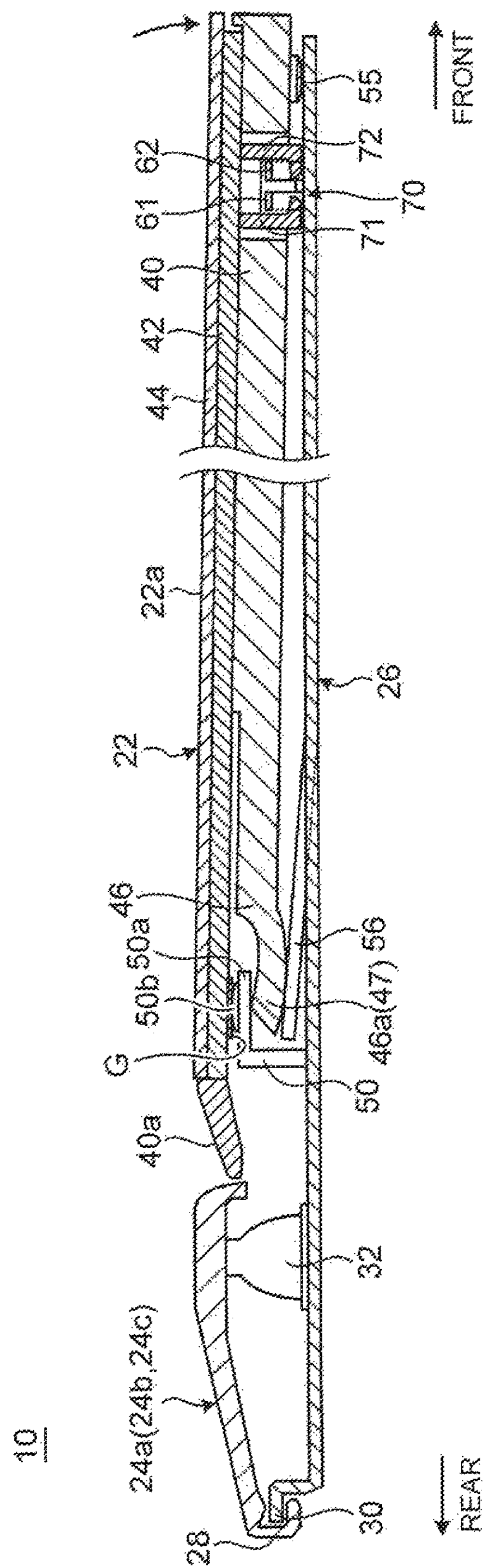
FIG. 8 is a cross-sectional side view showing the state where the touch pad in the input device is being pressed.
Figure 9A:
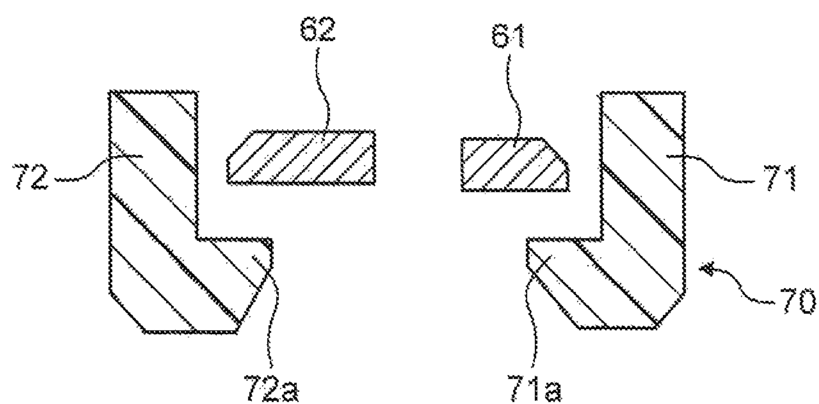
FIGS. 9A-9B are cross-sectional views taken along line IX-IX of FIG. 5.
Figure 9B:
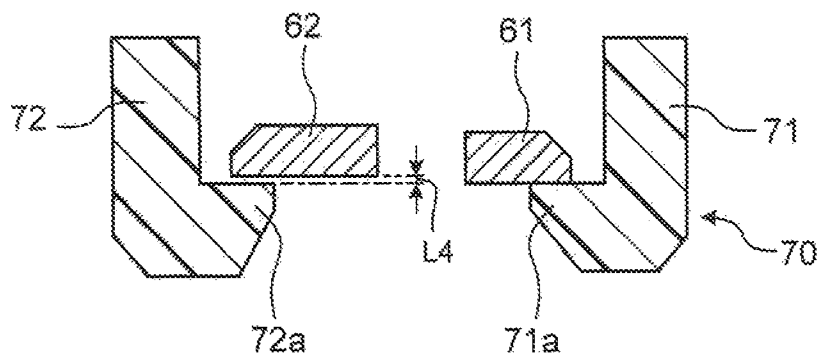

FIG. 8 is a cross-sectional side view showing the state where the touch pad 22 in the input device 10, according to a preferred embodiment of the present invention is pressed. FIGS. 9A and 9B are cross-sectional views taken along the line IX-IX of FIG. 5. FIG. 9A shows the state where the touch pad 22 is pressed, and FIG. 9B shows the state where the touch pad returns to the original position after it was being pressed (i.e., the state where it is not pressed).

As shown in FIG. 8. when the front part of the touch pad 22 pressed, the touch pad 22 rotates relative to the protruding pieces 50 so that the front part of the touch pad 22 goes down. At this time, the detection switch 55 is pressed, whereby such press operation is detected by the board plate 42. As shown in FIGS. 8 and 9A, when the touch pad is pressed, the first hook 61 and the first arm member 71, which were in a contact state, are separated. Then, the pressed touch pad returns to the original position, the first hook 61 and the first arm member 71 come into contact again, and a rebound sound is generated. In the input device 10, since the first hook 61 and the first arm member 71 have elasticity, the rebound sound is absorbed by such elastic parts, and the rebound sound is reduced.

Further in the input device 10 the second arm member 72 is configured so as to come into contact with the second hook 62 at a position above the ascending limit of the touch pad 22, and therefore a contact between the second arm member 72 and the second hook 62 can prevent detachment of the touch pad 22 from the base plate 26 even when a large force is applied thereto. That is the second arm member 72 and second hook 62 function as a retainer, and if a large force leading to a failure to specify the ascending limit of the touch pad 22 by the first arm member 71 and the first hook 61 is applied, the retainer can prevent the touch pad 22 from coming off from the base plate 26.

As shown in FIG. 9B, the second arm member 72 is configured so as to come into contact with the second hook 62 at a position above the ascending limit of the touch pad 22 by L4. Thus, when the touch pad 23 of the input device 10 returns to its original position after being pressed, the first arm member 71 and the first hook 61 come into contact initially to reduce rebound sound, and the second arm member 72 and the second hook 62 together function as a retainer.

Further, the second arm member 72 of the input device 10 has higher stiffness than that of the first arm member 71, and therefore if a large force is applied to the touch pad 22 and the base plate 26, a contact between the second hook 62 and the second arm member 72 having such high stiffness can function as a retainer to prevent any detachment of the touchpad 22 from the base plate 26.

Further, the second hook 62 of the input device 10 has higher stiffness than that of the hook 61, and therefore if a large force is applied to the touch pad 22 and the base plate 26, a contact between the second arm member 72 and the second hook 62 having such high stiffness can function as a retainer to prevent any detachment of the touch pad 22 from the base plate 26.

Further, the first arm member 71 and the second arm member 72 of the input device 10 protrude in the direction intersecting with the direction of the press operation to the touch pad 22, and therefore an increase in the dimension of the input device 10 in the thickness direction can be avoided, meaning that the input device 10 can be made thinner. It should be noted here that the first arm member 71 and the second arm member 72 preferably protrude in the direction substantially orthogonal to the direction of the press operation to the touch pad 22.

Further, since each latch 70 has a V-letter shape made up of the first arm member 71 and the second arm member 72, when the first hook 61 and the second hook 62 of the base plate 26 are pressed there from the below, the first arm member 71 and the second arm member 72 are pressed apart so as to enable fitting of the first hook 61 and the second hook 62 into the latch 70. The first an member 71 and the second arm member 72 have the protruding pieces 71*a*-72*a*, respectively, at their forward ends that protrude in their opposed direction. Then, the first hook 61 and the second hook 62 can come into contact with these protruding pieces 71*a*-72*a*, respectively.

As has been described, the present disclosure provides an electronic apparatus having an input device that is capable of reducing the sound generated when an operation-input part returns to its original position after being pressed.

The present embodiment describes the case where each latch has the first arm member and the second arm member, and the lath may not have such a second arm member. In this case, the base plate may not have a second hook.

Alternatively, each latch may have two opposed first arm members. In this case, these first arm members may come into contact with two first hooks, respectively, having elasticity.

While the disclosure has been particularly shown and described with reference to a preferred embodiment, it will be understood by those skilled in the art that various changes in form and detail may be made therein without departing from the spirit and scope of the disclosure.

What is claimed is:

1. A touch pad comprising:

a touch operation surface having a pseudo button area for receiving an input operation;

a base plate having a hook standing towards said pseudo button area of said touch operation surface; and a housing plate having an arm member with a protruding piece selectively comes into contact with said hook, wherein said arm member's protruding piece and said hook define an ascending limit of said pseudo button area of said touch operation surface, wherein said arm member and said hook have elasticity in their contacting direction to reduce rebound sound.

2. The touch pad of claim 1, wherein said base plate includes a second hook opposed to said hook; and said housing plate includes a second arm member opposed to said arm member, wherein said second arm member includes a protruding piece.

3. The touch pad of claim 2, wherein said second arm member has a higher stiffness than said arm member.

4. The touch pad of claim 2, wherein said second hook has a higher stiffness than said hook.

5. The touch pad of claim 2, wherein said second arm member's protruding pieces comes into contact with said second hook at a location above said ascending limit of said pseudo button area of said touch operation surface.

6. The touch pad of claim 1, wherein said hook is in an L-shape.

7. The touch, pad of claim 2, wherein said second hook is in an L-shape.

8. An electronic apparatus comprising:

a display;

a keyboard coupled to said display; and a touch pad includes:

a touch operation surface having a pseudo button area for receiving an input operation;

a base plate having a hook standing towards said pseudo button area of said touch operation surface; and a housing plate having an arm member with a protruding piece selectively comes into contact with said hook, wherein said arm member's protruding piece and said hook define an ascending limit of said pseudo button area of said touch operation surface, wherein said arm member and said hook have elasticity in their contacting direction to reduce rebound sound.

9. The electronic apparatus of claim 8, wherein said base plate includes a second hook opposed to said hook; and said housing plate includes a second arm member opposed to said arm member, wherein said second arm member includes a protruding piece.

10. The electronic apparatus of claim 9, wherein said second arm member has a higher stiffness than said arm member.

11. The electronic apparatus of claim 9, wherein said second hook has a higher stiffness than said hook.

12. The electronic apparatus of claim 11, wherein said second arm member's protruding pieces comes into contact with said second hook at a location above said ascending limit of said pseudo button area of said touch operation surface.

13. The electronic apparatus of claim 8, wherein said hook is in an L-shape.

14. The electronic apparatus of claim 9, wherein said second hook is in an L-shape.

15. The electronic apparatus of claim 8, wherein said base plate is connected to said housing plate as a single piece.

16. he touch pad of claim 1, wherein said base plate is connected to said housing plate as a single piece.

* * * * *